United States Patent
Meagher et al.

(10) Patent No.: US 10,437,345 B2
(45) Date of Patent: Oct. 8, 2019

(54) MODULAR FINGERTIP SENSORS

(71) Applicant: The Boeing Company, Chicago, IL (US)

(72) Inventors: Richard Meagher, Boothwyn, PA (US); John W. Glatfelter, Kennett Square, PA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 15/639,942

(22) Filed: Jun. 30, 2017

(65) Prior Publication Data
US 2019/0004610 A1    Jan. 3, 2019

(51) Int. Cl.
| | |
|---|---|
| *G06F 3/01* | (2006.01) |
| *G06F 1/16* | (2006.01) |
| *G06T 19/00* | (2011.01) |
| *G06K 9/00* | (2006.01) |
| *G06F 3/033* | (2013.01) |
| *G06F 16/00* | (2019.01) |
| *G06F 3/03* | (2006.01) |
| *G06F 3/038* | (2013.01) |
| *G06F 3/0484* | (2013.01) |

(52) U.S. Cl.
CPC ............ *G06F 3/017* (2013.01); *G06F 3/011* (2013.01); *G06F 3/014* (2013.01); *G06F 3/033* (2013.01); *G06F 3/0304* (2013.01); *G06F 3/0383* (2013.01); *G06F 16/00* (2019.01); *G06K 9/00355* (2013.01); *G06T 19/006* (2013.01); *G06F 3/04842* (2013.01); *G06F 2203/0331* (2013.01)

(58) Field of Classification Search
CPC ...... G06F 1/163; G06F 3/014; G06F 3/04815; G06F 2203/04106; G06F 3/017; G06F 3/033
See application file for complete search history.

(56) References Cited

U.S. PATENT DOCUMENTS

| | | | |
|---|---|---|---|
| 8,482,412 B2 * | 7/2013 | Majoros | G06K 7/0008 340/10.1 |
| 9,076,195 B2 * | 7/2015 | Mohammad | G06T 7/001 |
| 2008/0226134 A1 | 9/2008 | Stetten | |
| 2015/0130698 A1 * | 5/2015 | Burgess | G06F 1/163 345/156 |
| 2017/0172232 A1 * | 6/2017 | Anderson | A41D 19/0027 |

OTHER PUBLICATIONS

Apple Computer Pen http://appleinsider.com/articles/13/03/26/apples-reissued-pen-computer-patent-adds-cellular-connectivity-could-hint-at-future-mobile-device.
Finger Tip Haptic Sensing with Camera—https://www.ncbi.nlm.nih.gov/pmc/articles/PMC4848062/.

* cited by examiner

*Primary Examiner* — Xuemei Zheng
(74) *Attorney, Agent, or Firm* — McDonnell Boehnen Hulbert & Berghoff LLP

(57) ABSTRACT

A sensor system includes a finger mount comprising a sleeve, where the sleeve is configured to attach to a finger of a user. The system also includes a processing unit coupled to the finger mount, and a sensory attachment coupled to the finger mount, where the sensory attachment is communicatively coupled to the processing unit. The system also includes a grounding component conductively coupled to the finger mount.

20 Claims, 8 Drawing Sheets

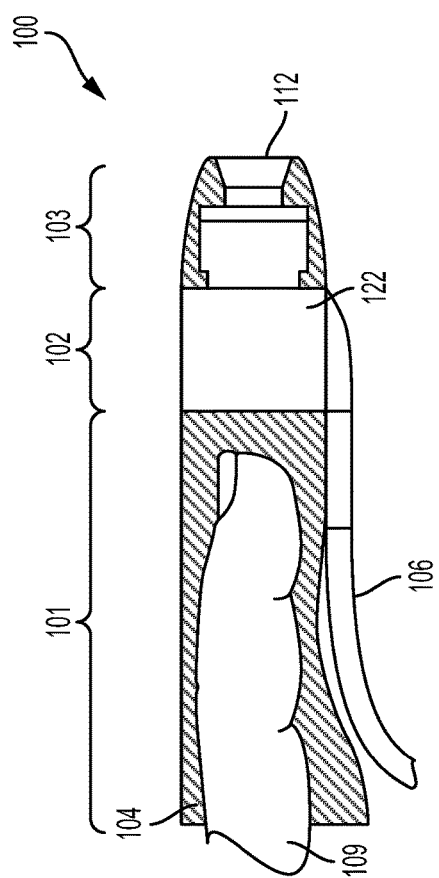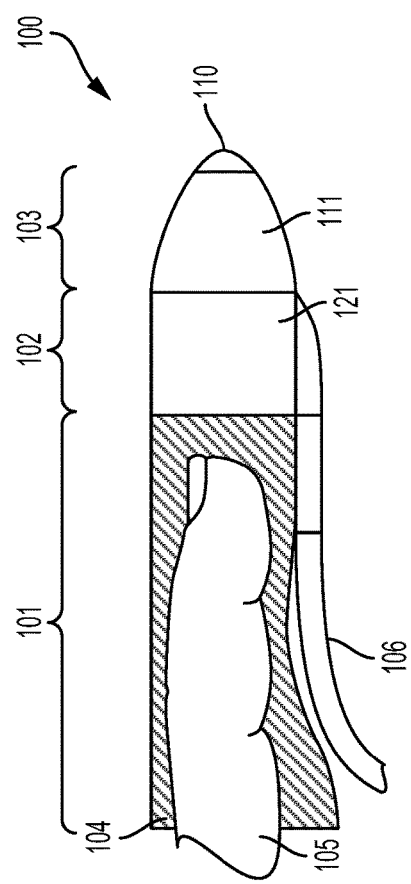

MODULAR FINGERTIP SENSORS

FIELD

The present disclosure generally relates to modular fingertip sensors and a method for locating and identifying parts in a manufacturing environment.

BACKGROUND

In some complex manufacturing applications, it may be difficult to accurately identify a particular part in the constructed environment. For example, an aircraft may be constructed based on a design plans that detail where each part is located and how they are intended to fit together. However, it may be difficult for a person to identify exactly which part he or she is looking at when they are interacting with the assembled aircraft, for purposes of installation verification, inspection, or defect investigation and troubleshooting, among other possibilities. Further, some areas of an assembled aircraft may be very compact, and it they may be difficult to access and consequently view these areas with the naked eye. Moreover, some manufacturing environments may include hazardous conditions, such as live electrical circuits, hazardous temperatures, and perhaps hazardous gases.

What is needed is a wearable sensor system that may allow a user to intuitively and relatively safely gather data using a plurality of different sensors, and which may allow the user to locate and identify parts within a complex manufacturing environment.

SUMMARY

In one example, a sensor system is described including a finger mount comprising a sleeve, where the sleeve is configured to attach to a finger of a user. The sensor system also includes a processing unit coupled to the finger mount, and a sensory attachment coupled to the finger mount, where the sensory attachment is communicatively coupled to the processing unit. The sensor system further includes a grounding component conductively coupled to the finger mount.

In another example, a method is described. The method includes receiving, by a computing device, location data from a finger-mounted radio frequency receiver, where the location data corresponds to a location of the finger-mounted radio frequency receiver within an environment. The method also includes receiving, by the computing device, image data from a finger-mounted image capture device, where the image data corresponds to the environment. The method also includes mapping, by the computing device, the location data and the image data to a three-dimensional model of the environment, where the three-dimensional model comprises a plurality of parts. The method also includes identifying, by the computing device, based on the location data and the image data, a particular part from the plurality of parts in the three-dimensional model of the environment.

In another example, a non-transitory computer readable medium is described. The non-transitory computer readable medium has instructions stored thereon, that when executed by a computing device, cause the computing device to perform functions including receiving location data from a finger-mounted radio frequency receiver, where the location data corresponds to a location of the finger-mounted radio frequency receiver within an environment. The instructions also include receiving image data from a finger-mounted image capture device, where the image data corresponds to the environment. The instructions further comprise mapping the location data and the image data to a three-dimensional model of the environment, where the three-dimensional model comprises a plurality of parts. The instructions also include identifying, based on the location data and the image data, a particular part from the plurality of parts in the three-dimensional model of the environment.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

FIG. 1 illustrates a sensor system, according to an example implementation.

FIG. 2 illustrates another sensor system, according to an example implementation.

DETAILED DESCRIPTION

Figure 3:
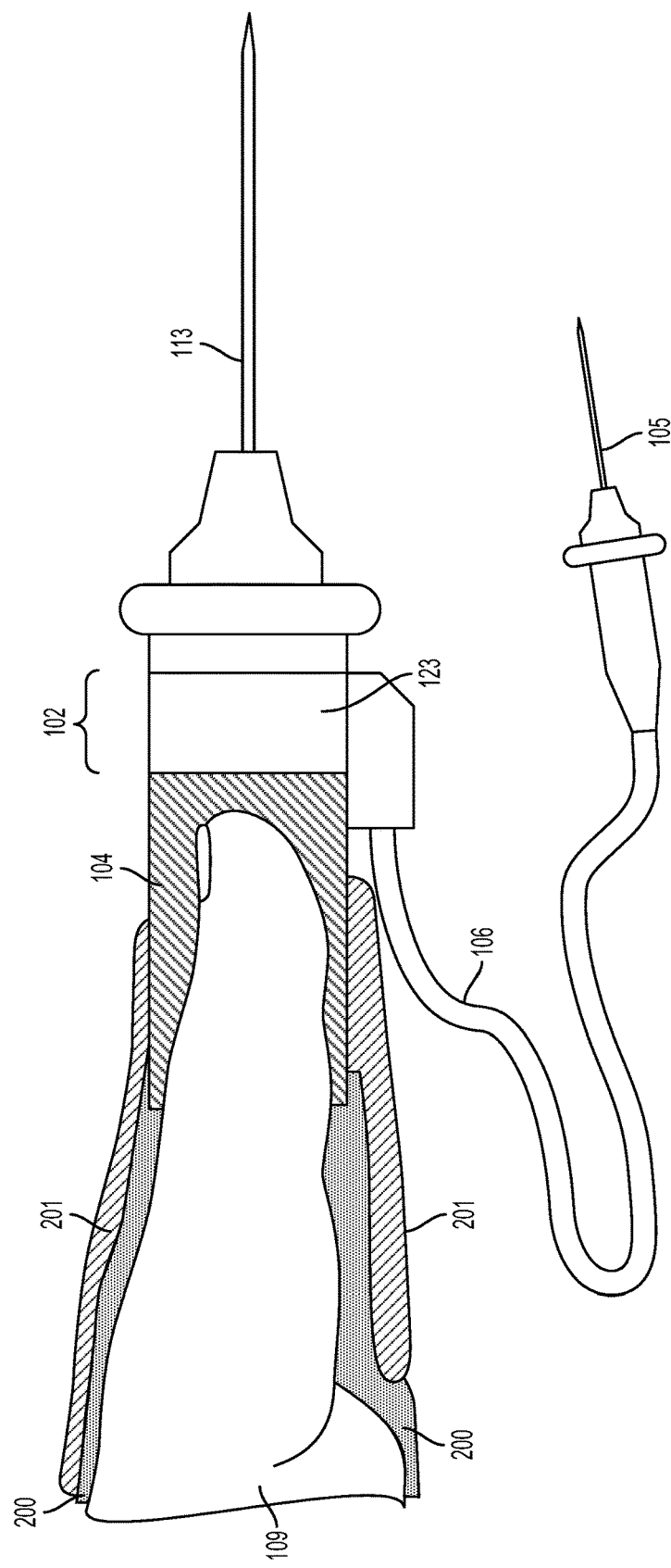
FIG. 3 illustrates a fingertip system, according to an example implementation.

Disclosed embodiments will now be described more fully with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Examples discussed herein include a sensor system including modular fingertip sensors, methods of operating the sensor system and a computer device to implement such operation. For example, the sensor system may include a finger mount, processing unit, and sensory attachment, which may be used for gathering data from an environment, such as a manufacturing environment for an aircraft. Further, the sensor system may be used as an intuitive way to locate and identify parts in the environment. For example, a user may utilize the sensor system 100 to identify parts within a complex manufacturing space by pointing at them with one or more fingertip sensory attachments.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Referring now to FIGS. 1 and 2, a sensor system 100 is shown. The sensor system 100 may be, for example, a wearable sensor system 100 including a finger mount 101. The finger mount 101 includes a sleeve 104 that is configured to be attached to a finger 109 of the user. For instance, the sleeve 104 may include a resilient material such that the sleeve 104 embraces the finger 109 of the user when attached thereto. The resilient material may be for example, nylon, elastic, a rubberized polymer, or any combination of resilient and/or non-resilient materials. In some cases, the resilient material of the sleeve 104 may accommodate a range of potential users, who may have different-sized fingers. The finger mount 101 may be attached to the finger 109 of the user in other ways as well. For example, the finger mount 101 may include one or more straps for affixing the finger mount 101 to the user's finger 109 in a ring-like fashion. Other possibilities also exist.

The sensor system 100 also includes a processing unit 102 coupled to the finger mount 101. The processing unit 102 may include one or more different modules, as further discussed below, for processing, and in some cases, converting received sensory inputs from analog to digital signals. Accordingly, the processing unit 102 may also include a communications interface for receiving the sensory inputs, as well as transmitting the sensory inputs, or a digital conversion of the sensory inputs, to a separate computing device.

The sensor system 100 also includes a sensory attachment 103 coupled to the finger mount 101, and communicatively coupled to the processing unit 102. As shown in FIGS. 1 and 2, the sensory attachment 103 is coupled to the finger mount 101 via a direct attachment to the processing unit 102. In other examples, the finger mount 101 may be configured such that both the processing unit 102 and the sensory attachment 103 are attached directly to the finger mount 101.

The sensory attachment 103 may take numerous forms. For instance, FIG. 1 illustrates a sensory attachment 103 that includes an image capture device 112, such as a camera. As further shown in FIG. 1, the processing unit 102 that is paired with the image capture device 112 may include an image processing unit 122, which may process image data received from the image capture device 112. As another example, FIG. 2 illustrates a sensor attachment that includes a radio frequency receiver 111, and the processing unit 102 includes a corresponding wireless communications interface 121. The radio frequency receiver 111 may be utilized as a positioning device, and may interface with one or more indoor positioning systems, such as a WiFi-based positioning system (WPS), a radio-frequency identification system (RFID), a Bluetooth Low Energy system (BLE), among other possibilities. In this regard, the radio frequency receiver 111 may additionally or alternatively include a radio frequency transmitter, depending on the particular positioning system that is being used. In some other implementations, the radio frequency receiver 111 may be used with a satellite-based global positioning system (GPS). Other examples are also possible.

In some examples, in conjunction with the radio frequency receiver 111, the sensory attachment 103 may include an input device 110. As shown in FIG. 2, the input device 110 may take the form of a clickable button on the tip of the sensory attachment 103. The input device 110 may be used to provide an indication (i.e., a click of the button) that may correspond to the current position of the radio frequency receiver 111. This may allow the sensory attachment 103 to act as a sort of "pointer," which may be used to indicate locations or objects of interest in a given environment, as further discussed below.

The sensor system 100 may also include a grounding tether 106 conductively coupled to the finger mount 101. The grounding tether 106 may terminate in a grounding component 105, such as a grounding probe, which can be seen in FIG. 3. In some cases, the grounding tether 106 and grounding component 105 may be coupled directly to the finger mount 101, as shown in FIG. 1. In other examples, the grounding tether 106 and grounding component 105 may be coupled to the finger mount 101 via the processing unit 102, as shown in FIG. 2. Other examples are also possible. The grounding component 105 can be made from a number of different devices, such as, for example, an alligator clip, spring clap, electrical connector, etc. which with the grounding tether 106, provides grounding for the finger mount 101.

In some implementations, the grounding tether 106 and grounding component 105 may be used as a safety measure. For example, the sensor system 100 may be utilized in a manufacturing environment where electrical testing is taking place, or where live electrical circuits may be present. Therefore, it may be desirable to conductively connect the finger mount 101 to ground, via the grounding tether 106 and grounding component 105, before collecting sensory data with the sensory attachment 103. This may help to reduce the risk of electrocution if the finger mount 101 were to make contact with a live electrical circuit.

As can be seen in FIGS. 1 and 2, the finger mounts 101 and their associated processing units 102 and sensory attachments 103 may be interchangeable. Thus, the user might swap the sensor system 100 shown in FIG. 1 with the sensor system 100 shown in FIG. 2, depending the particular application. In other examples, the user might wear multiple finger mounts 101 at the same time, on different fingers 109. In this way, the sensory data obtained by the sensory attachments 103 may be used simultaneously. For instance, image data obtained by the image processing unit 112 and location data 501 obtained by the radio frequency receiver 111 may be used in conjunction to identify parts in a three-dimensional model of a given environment. This implementation will be discussed in more detail below.

Moving now to FIG. 3, another example of the sensor system 100 is shown, including the finger mount 101 and the processing unit 102. In FIG. 3, the sensory attachment 103 is a probe 113 for measuring values in an electrical circuit. Accordingly, the processing unit 102 shown in FIG. 3 may include a volt-ohm-milliammeter 123, sometimes referred to as a multimeter 123, for processing the measured values. An indication of the measured values may then be transmitted by the processing unit 102 to a computing device for display on a graphical interface, for instance.

In FIG. 3, the grounding component 105 is shown as a long, needle-like probe similar to the probe 113; however other configurations of the grounding component 105 are also possible. For example, as is mentioned above, the grounding component 105 may be configured as an alligator clip or other fastening device, such that it might be clipped in place, rather than held in place by the user.

FIG. 3 illustrates an additional implementation for attaching the finger mount 101 to the finger 109 of the user. For example, the sensor system 100 may include a glove 200 configured to be worn on a hand of the user, and one or more finger mounts 101 may form a portion of the glove 200. Additionally or alternatively, one or more finger mounts 101 may be removably attached to the glove 200. In some implementations, such as the one shown in FIG. 3, the finger mount 101 may include fasteners 201 for attachment of the finger mount 101 to the glove 200. The fasteners 201 may be, for instance, Velcro or the like. Further, the finger mount 101 shown in FIG. 3 includes the sleeve 104, however, the sleeve 104 might be omitted in an implementation where the finger mount 101 is attached to the glove 200 via the fasteners 201. Other examples and combinations are also possible.

Figure 4:
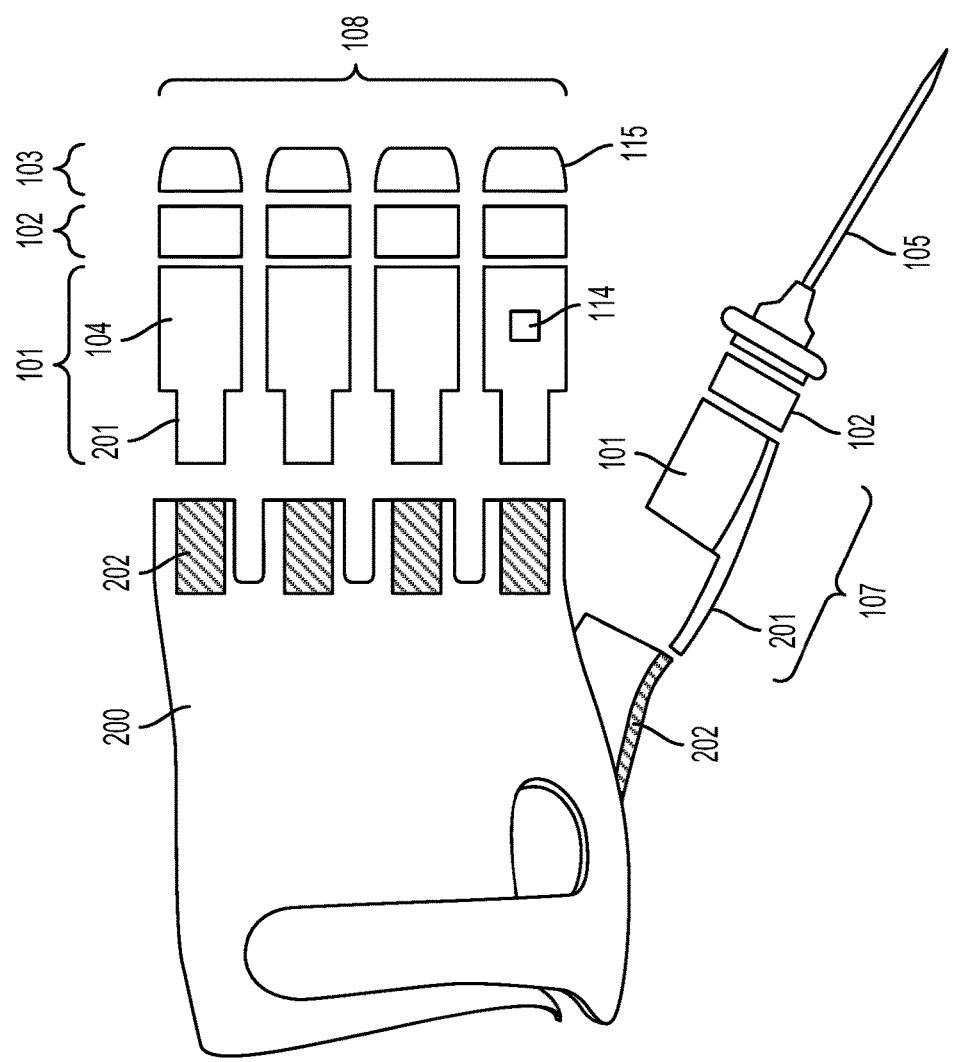
FIG. 4 illustrates a glove that is usable with a plurality of sensory attachments, according to an example implementation.

FIG. 4 shows another example of the sensor system 100, including a fingerless glove 200 and a plurality of sensory attachments 108. The finger mounts 101 shown in FIG. 4 include the fasteners 201, shown as strips extending from the sleeves 104. At the corresponding point on the glove 200, a fastening point 202 is shown. The fastening point 202 may be, for instance, the opposing Velcro surface for attachment to the fasteners 201. As noted above, the finger mounts 101 may alternatively form a part of the glove 200, such that the fasteners 201 are not necessary.

FIG. 4 also illustrates a thumb mount 107 configured to attach to a thumb of the user. In some implementations, as shown in FIG. 4, the grounding component 105 may be positioned on the thumb mount 107. For example, the grounding tether 106 may be woven or otherwise integrated into the glove 200. Additionally, the fasteners 201 may secure the finger mounts 101 to the glove 200 in such a way that the finger mounts 101 are in conductive contact with the integrated grounding tether 106. Thus, the probe 113, shown by way of example in FIG. 3, may be coupled to the grounding component 105, which could be shaped as a thumb-mounted grounding probe as shown in FIG. 4 when both are fastened to the glove 200. This may allow a user to measure values in an electrical circuit using probes attached to the user's forefinger and thumb, which may be convenient in some applications.

In some examples, such as those shown in FIGS. 1-3, the finger mount 101, the processing unit 102, and the sensory attachment 103 may form a unitary sensor system 100, which may be worn and used as a single unit. In other examples, the finger mount 101, processing unit 102, and sensory attachment 103 may each be separable components that may be combined in different ways. For instance, as shown in FIG. 4, one of the sensory attachments 103 may be a first sensory attachment 103 in a plurality of sensory attachments 108. Each other sensory attachment 103 may be configured to be removably coupled to the finger mount 101 and communicatively coupled to the processing unit 102 such that each other sensory attachment 103 is interchangeable with the first sensory attachment 103. This may allow a user to swap one modular sensory attachment 103 for another when different functionality is needed, rather than remove the entire finger mount 101. Other combinations are also possible.

FIG. 4 also shows another example of a sensory attachment 103, which includes an environmental sensor 115. The environmental sensor may detect environmental conditions surrounding the user, which may be useful for monitoring user safety, although other applications are also possible. For instance, the environmental sensor 115 may include a thermometer, a pressure sensor, or a sensor for detecting hazardous gases or radiation, among other possibilities. Accordingly, the processing unit 102 may be configured to generate and transmit an alert if a safety hazard has been detected, such as temperatures above or below a predetermined safety threshold.

Further, the sensor system 100 discussed herein may include sensors that are not situated at the user's fingertip. For instance, the environmental sensor 115 might be positioned elsewhere on finger mount 101, as the particular location and orientation of the environmental sensor 115 might not affect the environmental data that is collected.

As another example, FIG. 4 shows a biometric sensor 114 positioned on the sleeve 104 the finger mount 101 to collect biometric data corresponding to the user. The biometric sensor 114 might be, for example, a gyroscope or inertial measurement unit that may detect movements of the user—in particular, the user's hand. If the biometric sensor 114 does not detect any movement of the user for more than a predetermined period of time, it may indicate that the user needs assistance. Additionally or alternatively, the biometric sensor 114 may detect other information, such as a heart rate of the user. Accordingly, in some cases, the biometric sensor 114 may be positioned on an interior of the sleeve 104 such that it is in contact with the user when the sleeve 104 is worn.

Figure 5:
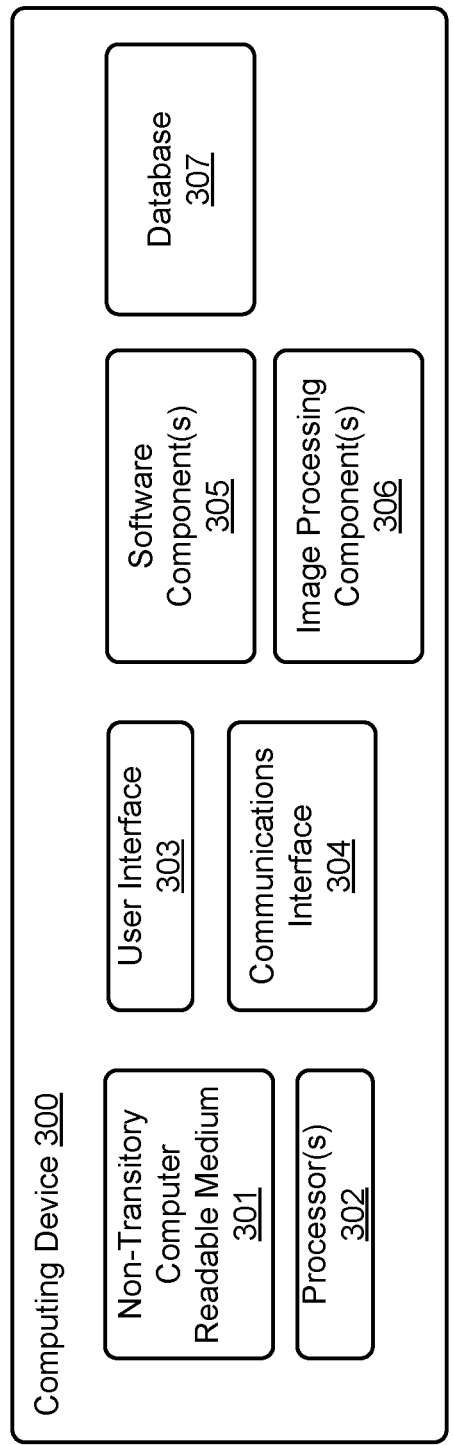
FIG. 5 illustrates a block diagram of an example computing device, according to an example implementation.

FIG. 5 illustrates a block diagram of an example computing device 300 that may be used in conjunction with some or all of the operations discussed herein. For instance, the computing device 300 may be a handheld computing device, such as a smart phone or tablet, that is in communication with the processing unit 102. In some implementations, the computing device 300 shown in FIG. 5 may be representative of all or part of the processing units 102 shown in FIGS. 1-4. Similarly, the processing units 102 shown in FIGS. 1-4 may take the form of the computing device 300. In some cases, the computing device 300 may be held by the user, or it may be remote from the user. Further, the computing device 300 shown in FIG. 12 might not be embodied by a single device, but may represent a combination of computing devices that may or may not be in the same location.

The computing device 300 may include a non-transitory, computer readable medium 301 that includes instructions that are executable by one or more processors 302. The non-transitory, computer readable medium 301 may include other data storage as well, such as memory for storing the collected sensor data from each sensory attachment 103. In some implementations, the computing device 300 may include a user interface 303 for receiving inputs from a user, and/or for outputting an indication of the received sensor data. For example, the user interface 303 may be a graphical interface. Other possibilities also exist.

In addition, the computing device 300 may be loaded with one or more software components 305 stored on the computer readable medium 301 and executable by the processor 302 to achieve certain functions. For example, the various sensory attachments 103 may require different software for their operation. Further, the computing device 300 may include image processing components 306 for processing the image data obtained by the image capture device 112. The computing device 300 may also include a database 307, which will be discussed if further detail below.

Figure 6:
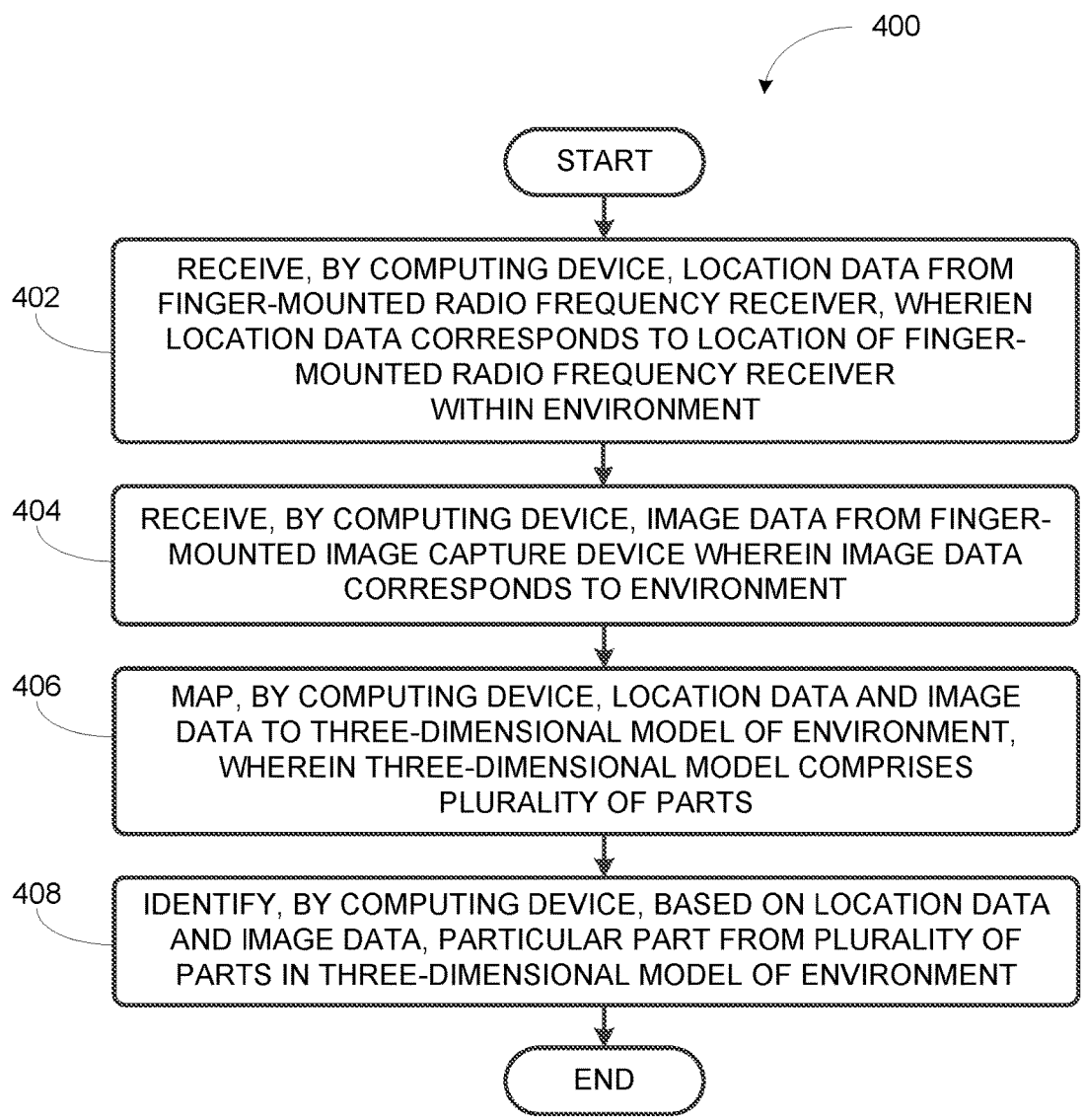
FIG. 6 shows a flowchart of an example method, according to an example implementation.

FIG. 6 shows a flowchart of an example method 400. Method 400 shown in FIG. 6 presents an embodiment of a method that, for example, could be used with the sensor system 100 as shown in FIGS. 1-4 and the computing device shown in FIG. 5. It should be understood that for this and other processes and methods disclosed herein, flowcharts show functionality and operation of one possible implementation of present embodiments. In this regard, each block in the flowchart may represent a module, a segment, or a portion of program code, which includes one or more instructions executable by a processor, such as the processor 302 of the computing device 300, for implementing or causing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

Alternative implementations are included within the scope of the example embodiments of the present disclosure, in which functions may be executed out of order from that shown or discussed, including substantially concurrently, depending on the functionality involved, as would be understood by those reasonably skilled in the art.

At block 402, the method 400 includes receiving, by a computing device, location data from a finger-mounted radio frequency receiver. The computing device may be the computing device 300 discussed above and shown in FIG. 5, and the radio frequency receiver may be the radio frequency receiver 111 discussed above and shown in FIG. 2. The location data may correspond to a location of the finger-mounted radio frequency receiver 111 within an environment.

Figure 7:
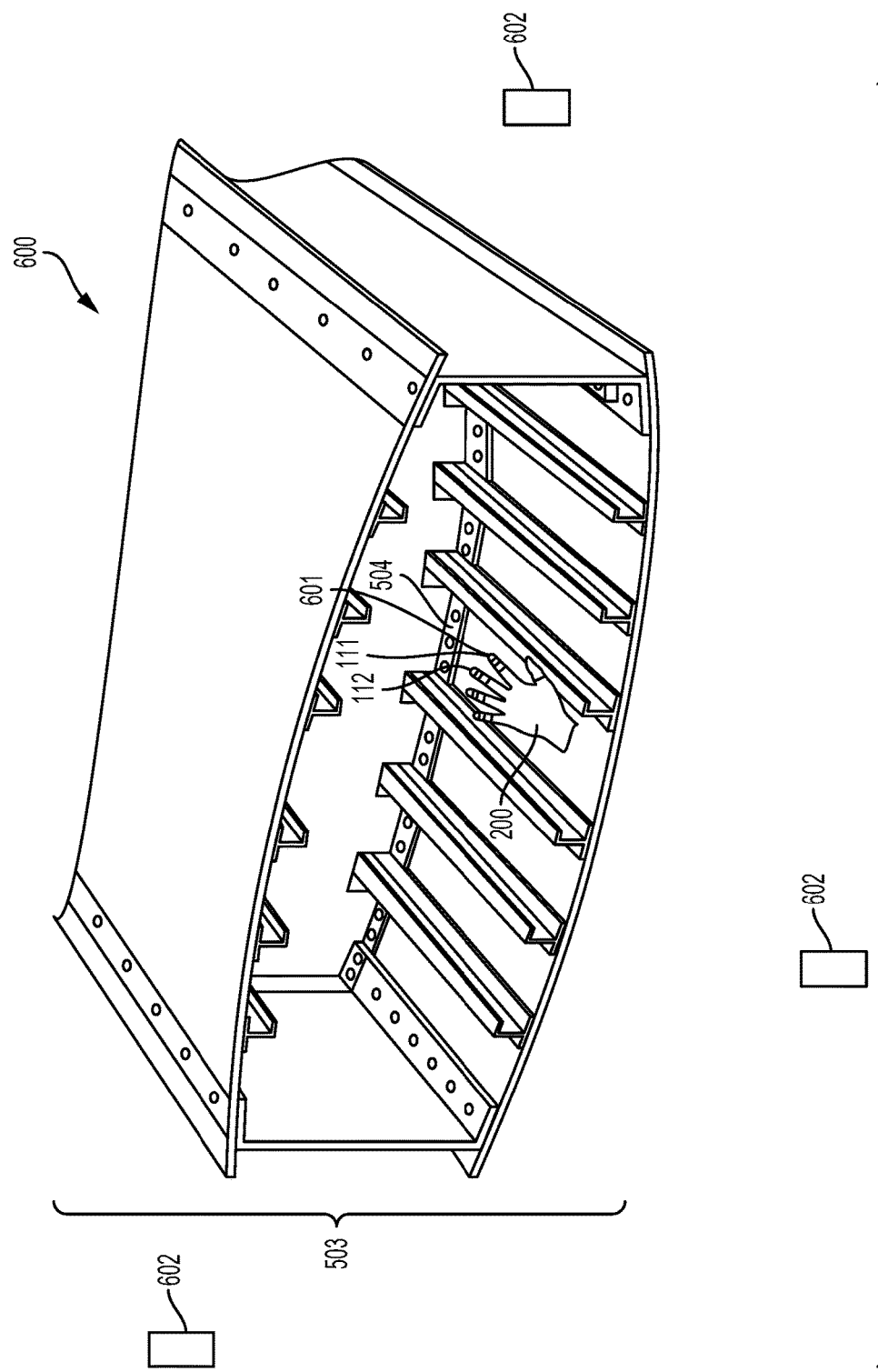
FIG. 7 illustrates a sensor system in a manufacturing environment, according to an example implementation.

For example, FIG. 7 shows an example implementation of using the sensor system 100, including the radio frequency receiver 111 fastened to the glove 200, in an environment 600. The environment 600 may be, for instance a manufacturing environment 600 for an aircraft. Accordingly, FIG. 7 shows a portion of the wing box for an aircraft that may be in the assembly process. The sensor system 100 may be used for various applications in the environment 600, such as installation verification, defect investigation and mapping, among other possibilities.

Further, the environment 600 may include a plurality of location devices 602, which may operate in conjunction with the radio frequency receiver 111 to determine the location 601 of the radio frequency receiver 111 within the environment 600. For instance, the location devices may be WiFi access points, RFID access points, BLE beacons, among other examples.

At block 404, the method 400 includes receiving, by the computing device 300, image data from a finger-mounted image capture device. For example, the image capture device may be the image capture device 112 shown in FIG. 1 and discussed above. As shown in FIG. 7, the image capture device 112 may be coupled to a second finger mount 101, and fastened to the glove 200 at a second finger of the user and used simultaneously with the radio frequency receiver 111. Further, the image data received by the computing device 300 may correspond to the environment 600. For instance, the image capture device 112 may capture video of the wing box at the location of the image capture device 112.

At block 406, the method 400 includes mapping, by the computing device 300, the location data and the image data to a three-dimensional model of the environment 600. For example, the wing box may be embodied in computer assisted design software as a three-dimensional model, which may be a scale representation of the wing box. Mapping the location data and the image data to the three-dimensional model may include orienting the environment 600 within a coordinate system, which may be established based on the real world position of the wing box with respect to each of the location devices 602, for example. Then, based on the location 601 of the radio frequency receiver 111 with respect to the location devices 602, the computing device 300 may determine the corresponding location within the three-dimensional model.

Further, the computing device 300 may use the received image data in conjunction with image recognition software to determine the relative orientation of the image capture device, i.e., what the image capture device 112 is "looking at." For example, the three-dimensional model may include a plurality of parts 503 that corresponds to the plurality of parts making up the assembled wing box. The image data captured by the image capture device 112 may contain images of one or more parts in the plurality of parts 503, including their size, shape, and relative arrangement with respect to each other within the wing box. The images may then be used as a basis for the image recognition software to search the three-dimensional model for a matching, or approximately matching image. For instance, the computing device 300 may query a database, such as the database 307, corresponding to the three-dimensional model of the environment 600. For example, the database 307 may contain a set of images taken from the three-dimensional model, showing the parts of the assembled wing box from various perspectives and orientations. Further, the location 601 of the radio frequency receiver 111, determined based on the received location data, may allow the computing device 300 to focus the image recognition software's search on particular portions of the three-dimensional model.

This may allow the computing device 300 to identify particular parts within the three-dimensional model, based on the received image data and location data. Accordingly, at block 408, the method 400 includes identifying, by the computing device 300, based on the location data and the image data, a particular part from the plurality of parts 503 in the three-dimensional model of the environment 600. For instance, for particular part 504 may be the bulkhead flange shown in FIG. 7, which may be of interest for purposes of installation or defect investigation, among other reasons. Based on the location of the radio frequency receiver 111, shown in FIG. 7 in the general vicinity of the bulkhead flange 504, as well as the image data captured by the image capture device 112, which may include an image of the bulkhead flange 504, the computing device may identify the bulkhead flange 504.

Figure 8:
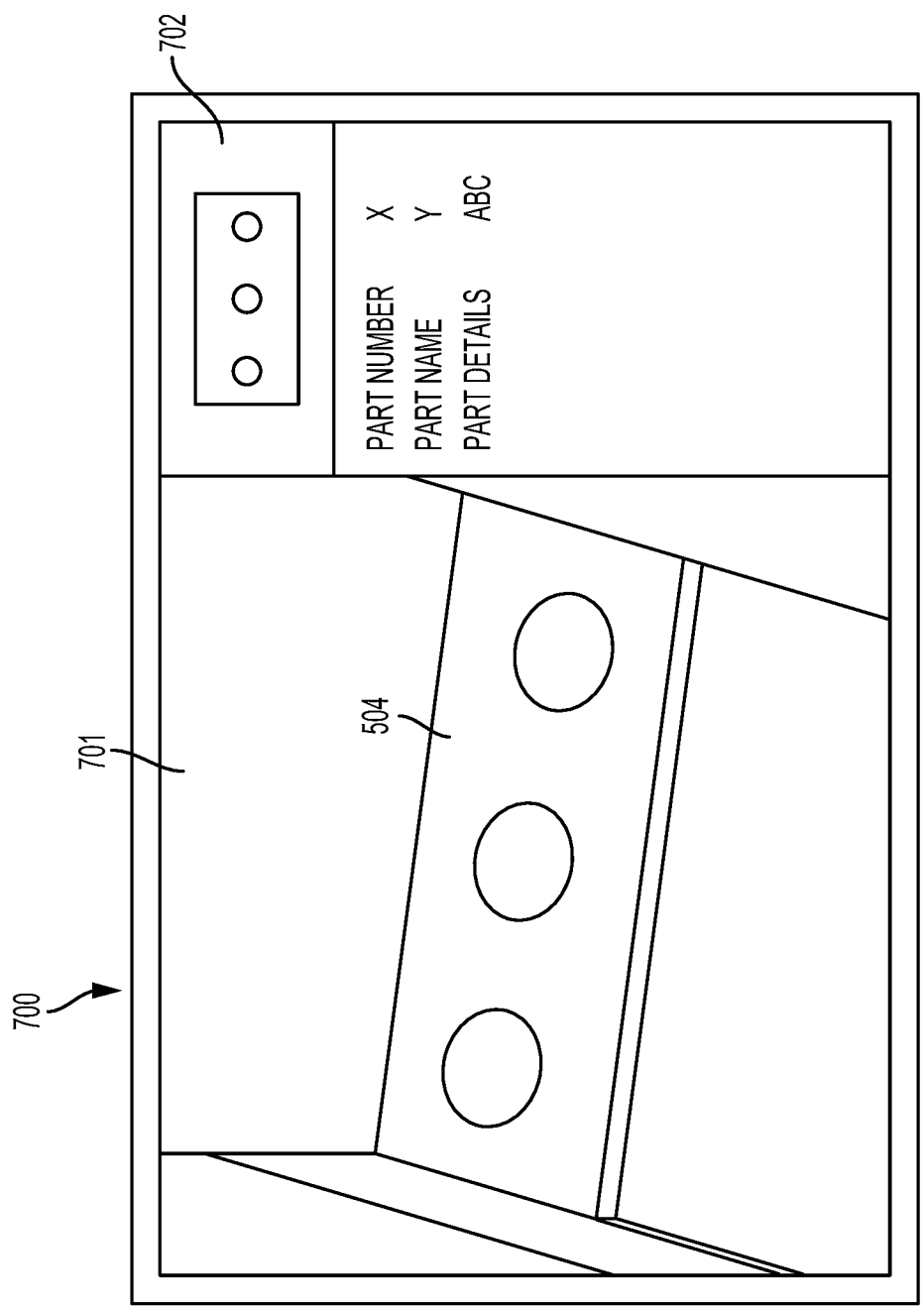
FIG. 8 illustrates a graphical interface, according to an example implementation.

The identification of the particular part may be used in a number of ways. For example, the computing device 300 may store the identification in memory, and flag the particular part 504 as properly installed, or perhaps flag it for repair or replacement, among other possibilities. In other implementations, the computing device 300 may include a graphical interface which may display the particular part 504. For instance, FIG. 8 shows an example graphical interface 700.

The computing device 300 may display, on the graphical interface 700, a graphical representation 701 of the image data that is received from the image capture device 112. For example, as shown in FIG. 8, the graphical representation 701 of the image data may be a close up view of the particular part 504, due to the relative position of the image capture device 112 to the particular part 504.

In some implementations, the graphical display 700 may further include a graphical identification of the particular part 504. For instance, the example graphical display 700 shown in FIG. 8 includes a side panel that shows the particular part 504 in isolation, and may include additional information about the particular part 504, such as a part number X, a party name Y, and any number of additional part details ABC. In some other examples, the graphical identification of the particular part 504 may take a different form. For instance, the graphical representation 701 of the image data may include an overlaid arrow, highlighting or other graphical indicia that may identify the particular part 504. Other possibilities also exist.

In some implementations, the computing device 300 may receive an additional indication, such as an indication from the input device 110 shown in FIG. 1, for purposes of identifying the particular part 504. For example, before identifying the particular part 504 form the plurality of parts 503, the computing device 300 may receive an indication of the particular part 504 to be identified. In some examples, the user may use the input device 110 to touch the particular part 504, depressing a button of the input device 110. Because the location data from the radio frequency receiver 111 may be received by the computing device 300 on an ongoing basis, the location data may normally exhibit some variation, as the user moves his or her hand during operation. The indication from the input device 110 may allow the computing device 300 to focus on the location of the radio frequency receiver 111 at the specific point in time when the button was depressed, which may increase the accuracy and usefulness of the received location data.

Figure 9:
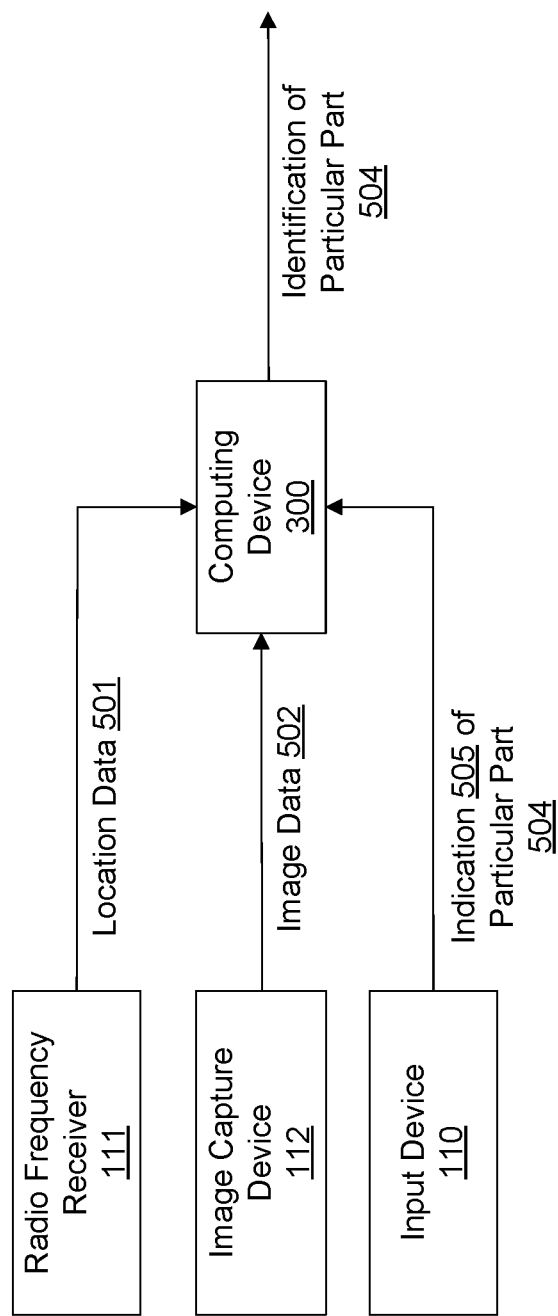
FIG. 9 illustrates a communications flow diagram, according to an example implementation.

FIG. 9 illustrates a communications flow diagram for the inputs that may be received by the computing device 300. For example, as discussed above, the computing device 300 may receive, from the radio frequency receiver 111, the location data 501. The computing device 300 may also receive the image data 502 from the image capture device 112, and an indication 505 of the particular part 504 from the input device 110. Based on these inputs, the computing device 300 may identify the particular part 504 within the three dimensional model, and then provide an identification of the particular part 504.

The identification of the particular part 504 may be based on fewer than all of the inputs noted above. In some implementations, the identification of the particular part might be based only on the location data 501, or on the location data 501 in conjunction with the indication 505 from the input device 110. Other combinations are also possible.

Finally, as noted above, the sensor system 100 may be used within the environment 600 for other operations other than identifying the particular part 504. For example, the computing device 300 may receive, from a finger-mounted probe, a measured value in an electrical circuit. The finger mounted probe may be the probe 113 shown in FIG. 3, which may be used for verification and testing of components within the environment 600. After receiving the measured value, the computing device 300 may display, via a graphical interface, an indication of the measured value in the electrical circuit. For instance, the computing device may display a measured voltage or current reading on the graphical display 700.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A sensor system comprising:
a finger mount comprising a sleeve, wherein the sleeve is configured to attach to a finger of a user, wherein the finger mount includes a first end and a second end, wherein when worn the finger of the user is positioned into the first end of the finger mount;
a processing unit coupled to the second end of the finger mount;
a sensory attachment coupled to the finger mount, wherein the sensory attachment is communicatively coupled to the processing unit, wherein the sensory attachment is coupled to the second end of the finger mount so as to be positioned at a fingertip of the finger of the user, wherein the processing unit is positioned between the finger mount and the sensory attachment;
a grounding component conductively coupled to the finger mount; and
a glove configured to be worn on a hand of the user, wherein the finger mount is removably attached to a portion of the glove.

2. The sensor system of claim 1, wherein the sensory attachment comprises a radio frequency receiver, wherein the processing unit comprises a wireless communications interface.

3. The sensor system of claim 1, wherein the sensory attachment comprises an image capture device, and wherein the processing unit comprises an image processing unit.

4. The sensor system of claim 1, wherein the sleeve of the finger mount comprises a resilient material such that the sleeve embraces the finger of the user when attached thereto.

5. The sensor system of claim 1, wherein the sensory attachment comprises a probe for measuring values in an electrical circuit, and wherein the processing unit comprises a volt-ohm-milliammeter.

6. The sensor system of claim 5, further comprising a thumb mount configured to attach to a thumb of the user, wherein the grounding component is a probe positioned on the thumb mount.

7. The sensor system of claim 1, wherein the sensory attachment is a first sensory attachment of a plurality of sensory attachments, wherein each other sensory attachment is configured to be removably coupled to the finger mount and communicatively coupled to the processing unit such that each other sensory attachment is interchangeable with the first sensory attachment.

8. The sensor system of claim 1, wherein the finger mount further comprises at least one biometric sensor positioned on the sleeve to collect biometric data corresponding to the user.

9. The sensor system of claim 1, wherein the sensory attachment comprises at least one environmental sensor.

10. The sensor system of claim 1, wherein the glove is a fingerless glove, and wherein the finger mount couples to the glove at a fastening point on the glove corresponding to a location where a finger extends from the glove.

11. A method comprising:
receiving, by a computing device, location data from a finger-mounted radio frequency receiver, wherein the location data corresponds to a location of the finger-mounted radio frequency receiver within an environment;
mapping the location data of the finger-mounted radio frequency receiver to a corresponding model location of the finger-mounted radio frequency receiver within a three-dimensional model of the environment;
receiving, by the computing device, image data from a finger-mounted image capture device, wherein the image data corresponds to the environment;
using the corresponding model location of the finger-mounted radio frequency receiver within the three-dimensional model of the environment to focus a search within a portion of the three-dimensional model of the environment for matching parts of a plurality of parts in the image data to corresponding parts in the portion of the three-dimensional model of the environment;
matching one or more parts of the plurality of parts in the image data to the corresponding parts in the portion of the three-dimensional model of the environment; and
outputting an identification, by the computing device, based on the corresponding model location of the finger-mounted radio frequency receiver within the three-dimensional model and the corresponding parts in the three-dimensional model of the environment to which the one or more parts of the plurality of parts in the image data are found to be matching, of a particular part from the plurality of parts in the three-dimensional model of the environment.

12. The method of claim 11, further comprising:
before outputting the identification of the particular part from the plurality of parts, receiving, by the computing device, an indication of the particular part to be identified.

13. The method of claim 11, further comprising:
displaying, via a graphical interface, a graphical representation of the image data, wherein the graphical representation of the image data includes a graphical identification of the particular part.

14. The method of claim 11, wherein matching one or more parts of the plurality of parts in the image data to the corresponding parts in the portion of the three-dimensional model of the environment comprises querying a database corresponding to the three-dimensional model of the environment.

15. The method of claim 11, further comprising:
receiving, by the computing device, from a finger-mounted probe, a measured value in an electrical circuit; and
displaying, via a graphical interface, an indication of the measured value in the electrical circuit.

16. A non-transitory computer readable medium having stored thereon instructions, that when executed by a computing device, cause the computing device to perform functions comprising:
receiving location data from a finger-mounted radio frequency receiver, wherein the location data corresponds to a location of the finger-mounted radio frequency receiver within an environment;
mapping the location data of the finger-mounted radio frequency receiver to a corresponding model location of the finger-mounted radio frequency receiver within a three-dimensional model of the environment;
receiving image data from a finger-mounted image capture device, wherein the image data corresponds to the environment;
using the corresponding model location of the finger-mounted radio frequency receiver within the three-dimensional model of the environment to focus a search within a portion of the three-dimensional model of the environment for matching parts of a plurality of parts in the image data to corresponding parts in the portion of the three-dimensional model of the environment;
matching one or more parts of the plurality of parts in the image data to the corresponding parts in the portion of the three-dimensional model of the environment; and
outputting an identification, based on the corresponding model location of the finger-mounted radio frequency receiver within the three-dimensional model and the corresponding parts in the three-dimensional model of the environment to which the one or more parts of the plurality of parts in the image data are found to be matching, of a particular part from the plurality of parts in the three-dimensional model of the environment.

17. The non-transitory computer readable medium of claim 16 further comprising instructions, that when executed by the computing device, cause the computing device to perform functions comprising:
before outputting the identification of the particular part from the plurality of parts, receiving, by the computing device, an indication of the particular part to be identified.

18. The non-transitory computer readable medium of claim 16 further comprising instructions, that when executed by the computing device, cause the computing device to perform functions comprising:
displaying, via a graphical interface, a graphical representation of the image data, wherein the graphical representation of the image data includes a graphical identification of the particular part.

19. The non-transitory computer readable medium of claim 16, wherein matching one or more parts of the plurality of parts in the image data to the corresponding parts in the portion of the three-dimensional model of the environment comprises querying a database corresponding to the three-dimensional model of the environment.

20. The non-transitory computer readable medium of claim 16 further comprising instructions, that when executed by the computing device, cause the computing device to perform functions comprising:
receiving a measured value in an electrical circuit from a finger-mounted probe; and
displaying, via a graphical interface, an indication of the measured value in the electrical circuit.

* * * * *